(12) United States Patent
Padala et al.

(10) Patent No.: US 12,117,927 B2
(45) Date of Patent: *Oct. 15, 2024

(54) METHOD AND SYSTEM FOR SCALABLE PERFORMANCE TESTING IN CLOUD COMPUTING ENVIRONMENTS

(71) Applicant: INTUIT INC., Mountain View, CA (US)

(72) Inventors: Phanindra Padala, Fremont, CA (US); Saravanan Balasubramanian, Milpitas, CA (US); Jesse Raymond Suen, Mountain View, CA (US); Navin Kumar Jammula, Dublin, CA (US); Sumit Nagal, San Ramon, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/489,046

(22) Filed: Oct. 18, 2023

(65) Prior Publication Data
US 2024/0045793 A1 Feb. 8, 2024

Related U.S. Application Data

(63) Continuation of application No. 17/187,087, filed on Feb. 26, 2021, now Pat. No. 11,809,306.

(51) Int. Cl.
*G06F 11/36* (2006.01)
*G06F 9/50* (2006.01)
*G06F 11/34* (2006.01)

(52) U.S. Cl.
CPC ........ *G06F 11/3688* (2013.01); *G06F 9/5027* (2013.01); *G06F 11/3414* (2013.01); *G06F 11/3692* (2013.01); *G06F 11/3696* (2013.01)

(58) Field of Classification Search
CPC ............. G06F 11/3688; G06F 11/3692; G06F 9/5027; G06F 11/3696; G06F 11/3414
See application file for complete search history.

(56) References Cited

U.S. PATENT DOCUMENTS

| | | | |
|---|---|---|---|
| 8,826,068 B2 * | 9/2014 | Somendra ........... | G06F 11/3688 714/15 |
| 2003/0120825 A1 | 6/2003 | Avvari et al. | |
| 2009/0037910 A1 * | 2/2009 | Dantzig ................ | G06F 9/5044 718/100 |

(Continued)

*Primary Examiner* — Wei Y Zhen
*Assistant Examiner* — Brahim Bourzik
(74) *Attorney, Agent, or Firm* — Patterson + Sheridan, LLP

(57) ABSTRACT

Certain embodiments of the present disclosure provide techniques for performing performance tests against services in a computing environment. The method generally includes deploying application code to an application namespace hosted on a first set of resources in the computing environment. Testing code is deployed to an infrastructure namespace hosted on a second set of resources in the computing environment. A request to test the application code is received. The request generally includes information identifying a load to be generated in testing the application code. A plurality of container instances implementing the test code are instantiated based on the identified load to be generated to test the application code. A test is executed against the application code through the instantiated plurality of container instances.

17 Claims, 5 Drawing Sheets

(56) References Cited

U.S. PATENT DOCUMENTS

| | | |
|---|---|---|
| 2009/0199160 A1 | 8/2009 | Vaitheeswaran et al. |
| 2011/0010691 A1 | 1/2011 | Lu et al. |
| 2012/0311128 A1* | 12/2012 | Pechanec ............ G06F 11/3433 |
| | | 709/224 |
| 2013/0283103 A1 | 10/2013 | Lam et al. |
| 2014/0013315 A1* | 1/2014 | Genevski .................. G06F 8/60 |
| | | 717/170 |
| 2014/0026122 A1* | 1/2014 | Markande ........... G06F 11/3688 |
| | | 717/124 |
| 2014/0068335 A1 | 3/2014 | Bromley et al. |
| 2019/0044806 A1 | 2/2019 | Sedayao |
| 2019/0347023 A1 | 11/2019 | Sakdeo et al. |
| 2020/0364223 A1 | 11/2020 | Pal et al. |
| 2022/0121560 A1* | 4/2022 | Tetreault ............. G06F 11/3664 |

* cited by examiner

METHOD AND SYSTEM FOR SCALABLE PERFORMANCE TESTING IN CLOUD COMPUTING ENVIRONMENTS

CROSS REFERENCE TO RELATED APPLICATIONS

This application is a continuation of co-pending U.S. patent application Ser. No. 17/187,087, filed Feb. 26, 2021, which is incorporated herein by reference in its entirety.

INTRODUCTION

Embodiments of the present disclosure relate to testing software applications, and more specifically to scalably performing performance testing against software applications in cloud computing environments.

BACKGROUND

In many cases, a software application may be deployed in cloud computing environments to expose functionality to users of the software application without needing to install a local copy of the software application. To serve users of the software application, instances of the software application may be deployed in one or more virtual compute instances (e.g., containers, virtual machines, etc.), with the number of virtual compute instances on which the software application is deployed being based on the amount of transactions to be processed over a given time period. For example, one deployment may include instantiating a base number of instances of the software application corresponding to a base load for the application. As the load to be served increases (e.g., at times of peak demand), additional virtual compute instances can be generated to serve additional users of the software application.

To ensure that the software application is scalable and performs as expected, various performance tests can be executed against the software application in a testing environment. The testing environment may be similar to the production environment, in that instances of the software application can be generated and executed in one or more virtual compute instances in the testing environment prior to deployment to a production environment. However, because each application that may be tested in a testing environment (or different services in an application) may have different performance profiles and expected load, testing these applications (or individual services in the applications) may be a complicated task. For example, establishing a performance testing infrastructure that generates a small amount of traffic (e.g., a small number of transactions per second) may be a different task from establishing a performance testing infrastructure that generates a large amount of traffic (e.g., a large number of transactions per second). Performance infrastructure that generates a small amount of traffic may, for example, be implemented in a virtual compute instance with fewer resources than performance infrastructure that generates a larger amount of traffic. For example, the virtual compute instance for performance infrastructure may be implemented using a smaller number of processors assigned to the virtual compute instance, slower processors, less memory, etc. than would be used for performance infrastructure that generates a larger amount of traffic. Further, differing numbers of virtual compute instances may need to be instantiated in order to accurately test a software application or portions thereof.

Accordingly, techniques are needed to efficiently generate performance infrastructure for testing and deploying software applications in cloud computing environments.

BRIEF SUMMARY

Certain embodiments provide a computer-implemented method for performing performance tests against services in a computing environment. The method generally includes deploying application code to an application namespace hosted on a first set of resources in the computing environment. Testing code is deployed to an infrastructure namespace hosted on a second set of resources in the computing environment. A request to test the application code is received. The request generally includes information identifying a load to be generated in testing the application code. A plurality of container instances implementing the test code are instantiated based on the identified load to be generated to test the application code. A test is executed against the application code through the instantiated plurality of container instances.

Still further embodiments provide a computer-implemented method for deploying application code to a production environment based on performance tests performed against services in a computing environment. The method generally includes deploying application code to an application namespace hosted on a first set of resources in the computing environment. Testing code is deployed to an infrastructure namespace hosted on a second set of resources in the computing environment. A request to test the application code is received. The request generally includes information identifying a load to be generated in testing the application code. A plurality of container instances implementing the test code are instantiated based on the identified load to be generated to test the application code. A test is executed against the application code through the instantiated plurality of container instances. A consolidated test result is generated by merging test results generated by each of the plurality of container instances. One or more actions are taken with respect to the application code based on a comparison of the merged test results to a threshold performance level for the application code.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain embodiments of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
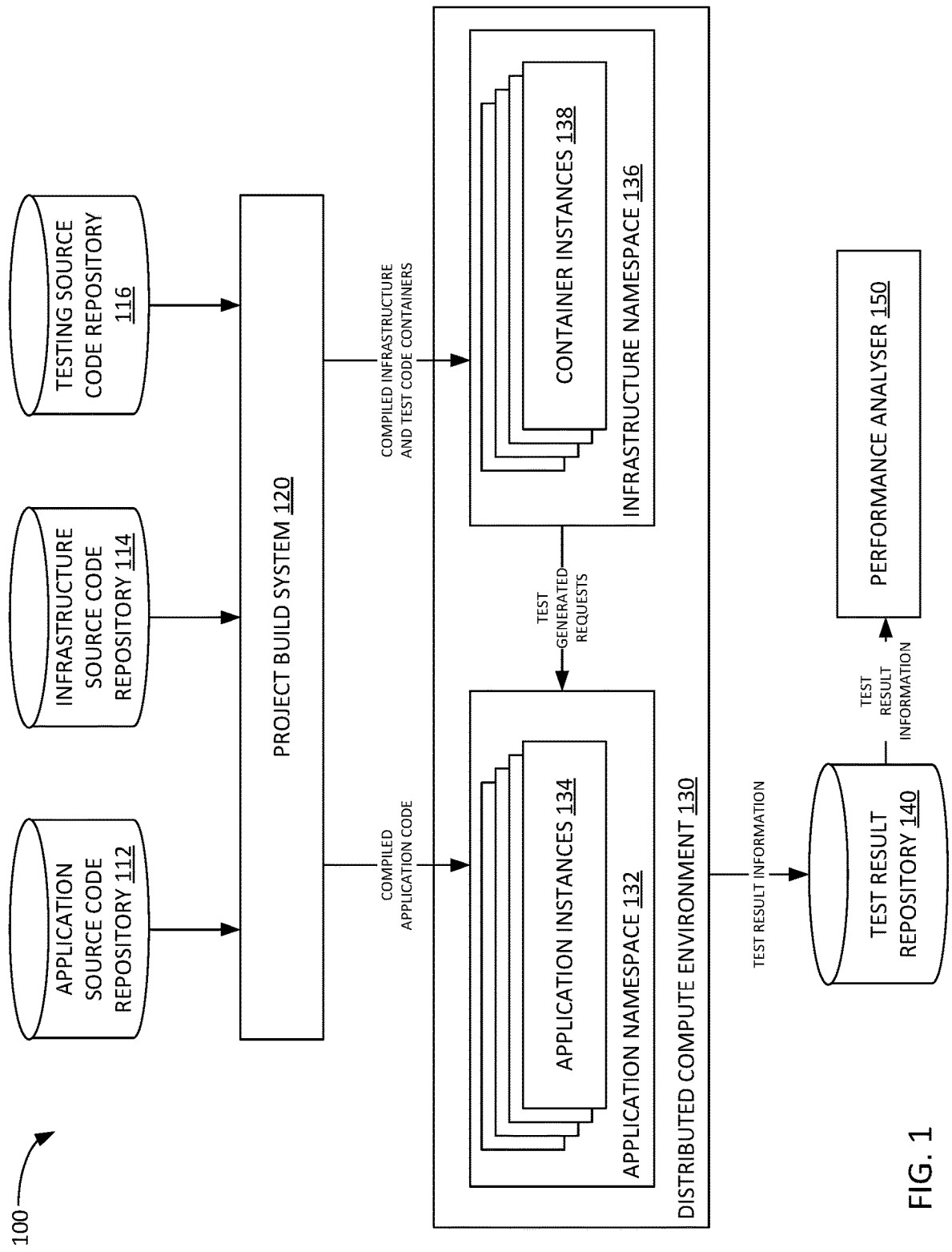
FIG. 1 illustrates an example computing environment in which testing code is scalably deployed in a distributed computing environment to test application code deployed in an application namespace in the distributed computing environment.

Embodiments of the present disclosure provide apparatuses, methods, processing systems, and computer-readable mediums for scalably performing performance tests against application code deployed in a distributed computing environment. Generally, application code may be deployed to one or more virtual compute instances in a distributed computing environment, and one or more container virtual compute instances may be instantiated in the distributed computing environment to execute various tests against the application code. The properties of the containerized virtual compute instances in which test code executes may be based on the properties of the application code to be tested, such as an expected amount of traffic that the application code is expected to process over a given time period, so that application code is tested using the appropriate amount of resources. Application code expected to experience high loading in real life (e.g., in a production environment) may be tested using test code deployed to virtual compute instances capable of generating a large amount of traffic. In contrast, application code expected to experience lower loading in real life may be tested using test code deployed to virtual compute instances capable of generating a smaller amount of traffic but incapable of generating the higher amount of traffic so that such application code is not tested for an unrealistically high amount of traffic. Generally, these virtual compute instances may have differing amounts of compute resources (e.g., processors, processor power, memory, etc.) with correspondingly different maximum amounts of traffic that can be generated. Thus, a virtual compute instance with a large amount of compute resources may have a larger maximum activity generation capability than a virtual compute instance with a smaller amount of compute resources.

Performance testing is an integral part of the software development process. Because software applications are generally expected to perform at a certain level, performance testing is generally used in the software development process to test application code prior to deployment in a production environment. Generally, application code that delivers the expected performance may be deployed to a production environment, while application code that does not deliver the expected performance may be blocked from deployment until the performance issues identified during performance testing are rectified. To test application code and ensure that the application code provides the expected level of performance prior to deployment, test code can be written to generate traffic that the application code is expected to process. If the application code consistently fails to provide a response to the traffic generated by the test code within a defined amount of time or provides incorrect responses, the application code may be deemed defective and blocked from deployment to a production environment. Otherwise, the application code may be deemed to comply with the expected behavior and marked as ready for deployment to the production environment.

Some software applications may be implemented as a collection of services or microservices. In such an implementation, each service may provide a specific portion of the functionality of the application. For example, one service may provide user authentication functionality; another service may allow for the execution of a specific workflow or portion thereof; still another service may provide for the processing of support requests; and so on. Each of the services in the application may have different performance characteristics. Testing these services using a same test code configuration may be inappropriate, as some services may be tested using an amount of traffic in excess of the expected amount of traffic, while other services may be tested using an amount of traffic that is significantly less than the expected amount of traffic. Thus, some services may be erroneously deemed as nonperformant, which may delay the deployment of application code. Further, other services may be erroneously deemed as compliant with performance requirements, which may allow code that ultimately degrades the performance of the application to be deployed to a production environment.

Embodiments described herein generally provide a scalable testing infrastructure for testing application code in a distributed computing environment. Generally, a scalable testing infrastructure may allow for the dynamic allocation and generation of virtual compute instances for testing application code in a development environment so that the number of virtual compute instances and the compute resource configuration for each of the virtual compute instances is dynamically generated for the application code being tested. By dynamically generating test code container instances that are tailored to the performance requirements or specifications for a specific application or portion thereof (e.g., a specific service exposing functionality within an application), application code may be tested using an expected amount of traffic and an appropriate amount of compute resources for testing the application code using the expected amount of traffic. Thus, application code may be tested using realistic testing scenarios, and deployment of application code that has been tested against realistic loads to a production environment.

By testing application code using a scalable testing infrastructure, aspects of the present disclosure may minimize the amount of compute resources used in testing application code. Within a distributed, on-demand computing environment, resources not needed for testing application code for the amount of traffic expected to be processed in a production environment may remain free for use by other applications or services in the distributed computing environment. Thus, testing application code using a scalable testing infrastructure may improve the accuracy of testing scenarios and allow for performant code to be deployed to a production environment, which may improve the reliability and availability of applications deployed to a production environment, as application code deployed to the production environment may be verified to work as expected for the expected amount of traffic expected to be processed by the application code. Further, because infrastructure for testing application code may be dynamically generated, aspects of the present disclosure may optimize the amount of computing resources needed for testing so that excess resources that would not be needed are not allocated for testing purposes. This may increase the amount of compute resources available in a distributed computing environment, and these available compute resources may be used to support existing applications experiencing additional load so that these existing applications continue to perform as expected or to new applications deployed within the distributed computing environment.

Example Systems for Scalable Performance Testing of Application Code in a Distributed Computing Environment FIG. 1 illustrates an example computing environment 100 in which test code is scalably deployed in a distributed computing environment for testing application code based on the expected performance characteristics of the application code.

As illustrated, computing environment 100 includes an application source code repository 112, infrastructure source code repository 114, testing source code repository 116, project build system 120, distributed compute environment 130, test result repository 140, and performance analyzer 150.

To test application code, project build system 120 uses code from each of application source code repository 112, infrastructure source code repository 114, and testing source code repository 116 to compile one or more instances of the application code and the testing code and deploys the compiled instances to distributed compute environment 130 for execution. Generally, to deploy application code for testing, project build system 120 retrieves the application code from source code repository and compiles the application code into one or more executable files. Project build system 120 can then instantiate an application namespace 132 in distributed compute environment 130 in which one or more executable files execute. Generally, the application namespace 132 represents a set of virtual compute instances accessible using the same name by test code executing in an infrastructure namespace 136 to test the application code. Project build system 120 can then deploy the compiled application code into one or more application instances 134, which represent discrete virtual compute instances on which the compiled application code executes.

In some aspects, the number of application instances 134 instantiated by project build system 120 may be commensurate with a number of virtual compute instances on which the compiled application code would be deployed in a production environment. Project build system 120 can instantiate the application instances 134 based on a configuration of the virtual machines on which the compiled application code would be deployed in a production environment so that the compiled application code is tested on virtual compute instances with the same or similar computing resources (e.g., processor power, memory, memory latency, etc.) in a testing environment.

For example, the configuration information associated with the application source code may explicitly define the configuration (e.g., number of processors or processing cores, types of processors or processing cores, amount of system memory, etc.) of the virtual machines on which the compiled application code is deployed in a production environment, and project build system 120 can instantiate virtual compute instances for application instances 134 with the same configuration.

In another example, the configuration information associated with the application source code may identify a baseline performance level of the virtual compute instances on which the compiled application code is deployed in a production environment (e.g., a number of floating point operations per second (FLOPS) that the virtual compute instances in the production environment are capable of performing). Project build system 120 can request that a deployment manager in distributed compute environment 130 generate virtual compute instances for application instances 134 according to the configuration information, which may guarantee that the application code is being tested on the same or similar system configurations and that the recorded performance of the compiled application code in application instances 134 is similar to that which would be experienced in a production environment.

To test the application source code in application namespace 132, project build system 120 can use the infrastructure source code in infrastructure source code repository 114 to generate and instantiate infrastructure namespace 136. Infrastructure namespace 136 generally represents a set of virtual compute instances accessible using the same name that is used to test application source code in application namespace 132. Generally, the infrastructure source code in infrastructure source code repository 114 includes code for establishing a namespace associated with the container instances 138 such that any of the container instances 138 in infrastructure namespace 136 can generate and send transaction requests to application namespace 132 for execution. After project build system 120 builds and deploys infrastructure namespace from the infrastructure source code in infrastructure source code repository 114, the test code can be compiled and deployed in one or more container instances 138 in infrastructure namespace 136.

To generate the container instances 138 for testing the compiled application source code executing in application instances 134, project build system 120 can use information about an expected number of transactions to be executed over a given time period the application source code and a number of transactions that a virtual compute instance can generate in order to determine the number and configuration of virtual compute instances to generate for container instances 138. In some aspects, project build system 120 can select the number and configuration of the virtual compute instances for container instances 138 according to a resource minimization strategy.

For example, if distributed compute environment 130 allow for the generation of virtual compute instances that support X transactions per second (TPS), Y TPS, and Z TPS, where X=3*Y and Y=3*Z, and the application source code is expected to process 2Y+Z TPS, project build system 120 can determine that the test can be performed using one virtual compute instance supporting X TPS or two virtual compute instances supporting Y TPS and one virtual compute instance supporting Z TPS. A resource minimization strategy that is configured to minimize the number of virtual compute instances generated within infrastructure namespace 136 may thus result in project build system 120 instantiating a single virtual compute instance supporting X TPS for the test. A resource minimization strategy that is configured, however, to minimize a total cost of performing a test may result in project build system 120 instantiating two virtual compute instances supporting Y TPS and one virtual compute instance supporting Z TPS, if the total cost is less than the total cost of executing the test using the single virtual compute instance supporting X TPS.

In some aspects, a plurality of virtual compute instances may be organized into a resource pod in distributed compute environment 130. Each resource pod may be associated with a maximum load (e.g., a maximum number of transaction requests per second) that can be generated against application instances 134 in application namespace 132. A number of resource pods may be instantiated by project build system 120 to execute the test code based on the maximum load associated with each resource pod available in distributed compute environment 130 and an identified load to be generated in testing the application source code executing in application instances 134. In some aspects, the maximum load may be defined in terms of a number of read requests and a number of write requests to be executed against virtual compute instances in the application namespace 132 over a given period of time (e.g., a number of read requests to process per second and a number of write requests to process per second).

Generally, project build system 120 may allow for any number of virtual compute instances in distributed compute environment 130 to be instantiated in order to test compiled application code executing on application instances 134 in application namespace 132. Because the number of container instances 138 and the configuration of the container instances 138 generated by project build system 120 may be dynamically defined according to the traffic profile of the application source code being tested, an appropriate amount of compute resources may be allocated for testing the application source code. Excess resources that may not be needed for testing application source code within distributed compute environment 130 may thus be allocated for other uses, such as concurrent testing of other application source code in a different application namespace. Because only the appropriate amount of compute resources are allocated for testing the application source code, aspects of the present disclosure may improve resource availability within the distributed compute environment 130, which may allow for additional compute resources to be used to improve or maintain the performance of other applications executing within distributed compute environment 130 or allow for additional applications to be tested and deployed within distributed compute environment 130.

After the virtual compute instances for container instances 138 are instantiated, project build system 120 can deploy the compiled test code to container instances 138 for execution. In some aspects, the same test code may be deployed to container instances 138; however, in some aspects, different test code may be deployed to container instances 138 based on the compute resources allocated to each of the individual container instances. Once the compiled test code is deployed to the container instances 138, testing may commence against the application source code deployed in application instances 134. As tests are executed against application source code deployed in application instances 134, the test code executing in container instances 138 can collect performance data for the test. The performance data may include, for example, timing information tracking the amount of time elapsed between transmission of a transaction request to application namespace 132 and receipt of a response from one of the application instances 134 in application namespace 132. In some aspects, the test code may include a threshold or benchmark time between transmission of a transaction request and receipt of a response from an application instance 134. If the measured time is less than the threshold or benchmark time, the test code executing in container instances 138 can mark the transaction request as having been successfully processed; otherwise, the test code can mark the transaction request as having failed. In some aspects, the test code deployed in container instances 138 may include a specification of a correct response for each transaction generated and transmitted to application instances 134 for execution. If the response from one of the application instances 134 matches the specified correct response, the test code executing in container instances 138 can mark the response as correct and, thus, that the transaction request was successfully processed. Otherwise, the test code executing can mark the response as incorrect, and thus, can determine that the application source code failed to process the transaction request.

A test executed within infrastructure namespace 136 may have a defined termination condition (e.g., based on a total number of transaction requests generated, a total amount of time, a threshold number of failed responses, etc.). When the defined termination condition is satisfied, the test code executing in container instances 138 may terminate testing and generate a report summarizing the results of the tests executed against compiled application source code in application namespace 132. The report generated by the test code in any given container instance 138 may include information identifying a number of transaction requests transmitted to application namespace 132, information about the number or proportion of transaction requests that were successfully executed, timing information, correctness information, and the like. In some aspects, the report may further include information about each of the transaction requests transmitted to application namespace 132, which developers of the application source can use in debugging the application source code. The report may be committed to test result repository 140, which represents a data repository from which performance analyzer 150 can pull data in order to determine whether the application source code being tested is ready for deployment in a production environment and from which developers can access testing information for use in debugging and developing the application source code.

In some aspects, one of the one or more container instances 138 may be designated as a lead container instance. The lead container instance may track the total number of transaction requests generated in testing application source code and may issue a termination command to the other container instances 138 when a test termination condition is satisfied.

In some aspects, the test code in the lead container instance may be configured to generate a consolidated test result based on the test results generated by the test code executing in each of the plurality of container instances. To generate the consolidated test result, the test code in the lead container instance can retrieve the test results generated by each of the plurality of container instances 138. The retrieved test results may be consolidated into a single test result by merging (e.g., adding, averaging, etc.) the retrieved test results. For example, a consolidated test result may include the total number of transaction requests generated by the container instances 138, an average response time over all of the transaction requests, a total number or percentage of successfully processed transaction requests across all of the container instances 138, and so on. The consolidated test result may then be committed to test result repository 140 for further use, such as performance trend analysis, determining whether to promote application source code from a development environment to a production environment, and so on.

Performance analyzer 150 generally uses the results of the tests executed by test code deployed to container instances 138 to determine whether the application source code under test meets the defined performance requirements for the application source code. The defined performance requirements for the application source code may be defined, for example, as a threshold average response time, threshold response correctness level, or the like.

If the test results indicate that the application performs as expected, performance analyzer 150 can deploy the application source code from application source code repository 112 to a production environment hosted in distributed compute environment 130 (not shown). To deploy the application source code, performance analyzer 150 can, in some aspects, instruct project build system 120 to compile the application source code and deploy the compiled application source code to one or more virtual compute instances associated with the production environment in distributed compute environment 130.

In some aspects, project build system 120 can be used to perform other types of testing against application code executing in application namespace 132. For example, project build system 120 may be configured to perform chaos testing against application code in application namespace 132. Generally, chaos testing allows for various failure scenarios to be performed in order to test the resiliency of application code to unexpected scenarios, such as simulated traffic overload scenarios, unexpected system failure, or the like. In some aspects, chaos testing may be used to simulate a cascading failure of multiple, interrelated application components. To execute a chaos test against application code, thus, project build system 120 may be configured to initially generate virtual compute instances in the application namespace 132 and infrastructure namespace 136 corresponding to a typical real-world load on the application code under test. Subsequently, project build system 120 may simulate various failure or otherwise chaotic scenarios against the application code executing in the application namespace 132. For example, to simulate a sudden increase in traffic, project build system 120 can instantiate additional container instances 138 in which test code can execute and generate additional traffic to be processed by application instances 134 in application namespace 132. In another example, to simulate a failure of one or more application components (e.g., services, microservices, etc.), project build system 120 can terminate one or more application instances 134 in application namespace 132. Other failures can also or alternatively be injected into application namespace 132 to execute a chaos test against application code. Chaos testing using chaos workflows orchestrated by project build system 120 may allow for automation and self-service of chaos testing, which may allow for efficient execution of chaos tests in a development environment while avoiding or minimizing negative impacts on a production system.

Figure 2:
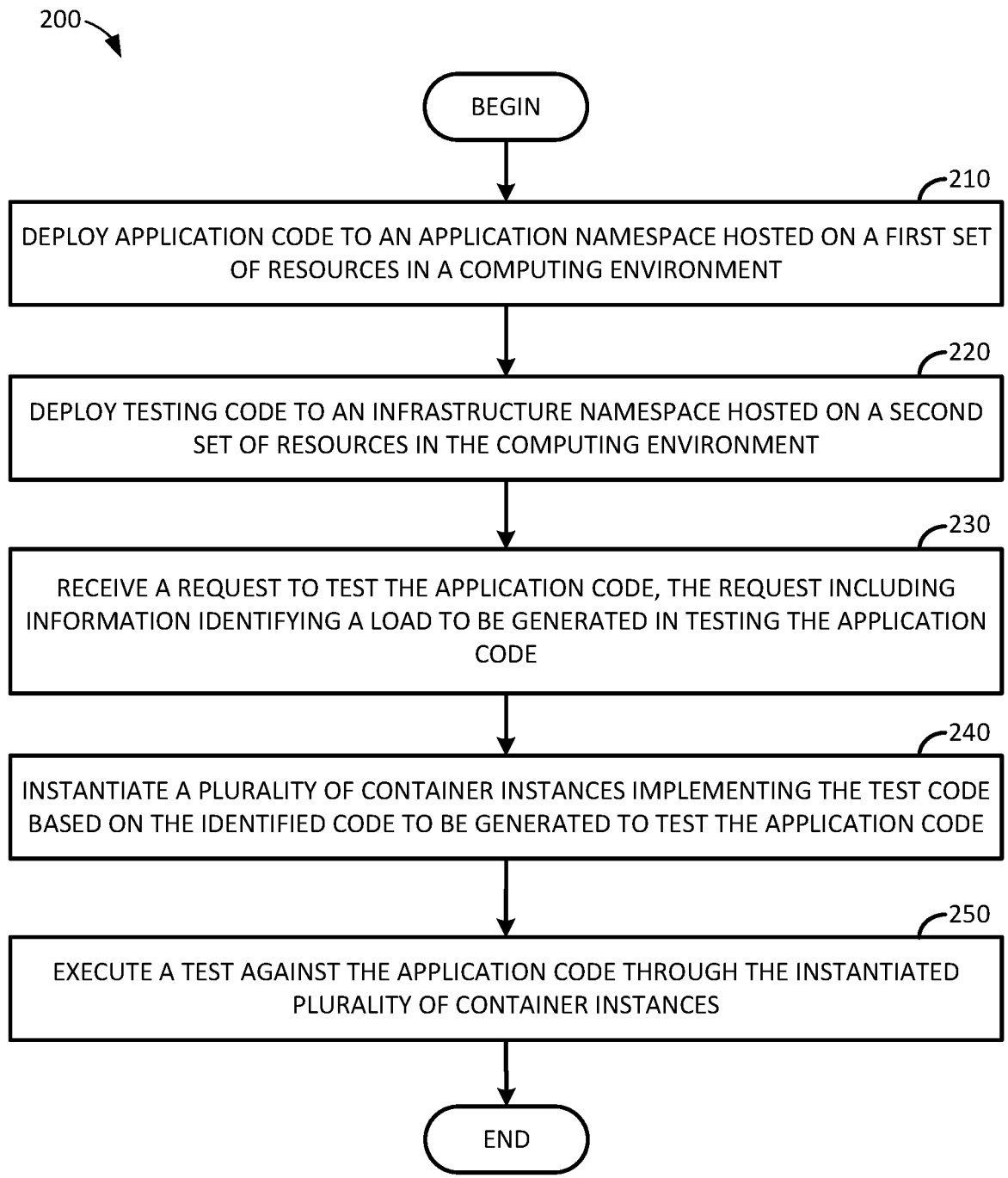
FIG. 2 illustrates example operations for performing scalable performance tests against services in a distributed computing environment.

Example Execution of Scalable Performance Tests Against Services in a Distributed Computing Environment FIG. 2 illustrates example operations 200 for scalably performing performance tests against services in a distributed computing environment. The operations described herein may be performed by one or more systems in a computing environment, such as project build system 120 and distributed compute environment 130 illustrated in FIG. 1.

As illustrated, operations 200 begin at block 210, where a system deploys application code to an application namespace hosted on a first set of resources in the computing environment. Generally, to deploy the application code to the application namespace, the system can instantiate an application namespace and a plurality of virtual compute instances on which the application code (or a compiled version of the application code) is to execute. The application namespace may represent a common name that test code executing on one or more virtual compute instances in an infrastructure namespace can reference to send transaction requests to the application code for processing. Generally, the resources on which the application code may be deployed may include one or more virtual compute instances available in a distributed computing environment. These virtual compute instances may be provisioned similarly to the virtual compute instances on which the application code (or compiled version of the application code) executes in a production environment, so that the application is tested in an environment that is the same as or similar to the production environment.

At block 220, the system deploys testing code to an infrastructure namespace hosted on a second set of resources in the computing environment. To deploy the testing code, the system can generate an infrastructure namespace representing a common name that application code executing in the application namespace can reference in transmitting responses to received transaction requests. Generally, the resources on which the testing code may be deployed may include a plurality of virtual compute instances. Each of the virtual compute instances may expose different processing capabilities so that a mix of virtual compute instances can be selected and instantiated to test the application source code according to the expected number of transactions the application source code is to process over a given time period.

In some aspects, the system can generate the infrastructure namespace by compiling infrastructure code and deploying the compiled infrastructure code. The infrastructure code may expose functionality for creating, maintaining, and terminating container instances (or groups of container instances) in which the test code executes. In some aspects, the infrastructure code may also expose functionality for terminating the infrastructure namespace after execution of a test is completed.

At block 230, the system receives a request to test the application code. The request generally includes information identifying a load to be generating in testing the application code. The identified load may include, for example, a number of transaction requests to be processed by the application code over a given amount of time (e.g., per second). The transaction requests may, in some aspects, be further broken down into read requests and write requests, as the number of read and write requests over a given time period may differ and read and write requests may have different performance profiles (e.g., read requests may generally be executed faster than write requests).

At block 240, the system instantiates a plurality of container instances implementing the test code based on the identified load to be generated to test the application code. To determine the number of container instances and the configuration of the container instances to be instantiated to test the application code, the system can use information about an amount of traffic that each type of virtual compute instance in the distributed computing environment can generate and the total amount of traffic over a given time period to be generated against the application code deployed to the application namespace. A minimal set of container instances may be instantiated to satisfy the total amount of traffic to be generated against the application code deployed to the application namespace. In some aspects, the minimal set of container instances may be the smallest number of virtual compute instances that can be used to generate the total amount of traffic. In another aspect, the minimal set of container instances may be the number of virtual compute instances that result in the generation of an amount of traffic that is closest to the specified total amount of traffic. In still further aspects, the minimal set of container instances may be the virtual compute instances that generate the total amount of traffic at the lowest cost.

At block 250, the system executes a test against the application code through the instantiated plurality of container instances.

In some aspects, the test may be terminated when a terminating condition is met. For example, the termination condition may include a duration over which the test is to be executed. When the system determines that an elapsed time over which the test has executed equals or exceeds the identified duration, the system can terminate the test. To terminate the test, the system can terminate each of the plurality of container instances implementing the test code. In some aspects, in terminating a container instance, the system can instruct the container instance to discontinue sending transaction requests to application code deployed in the application namespace and to commit the final test results to a test result repository. The final test results may be committed to the test result repository when a response to the last transaction request issued by the test code to the application code deployed in the application namespace is received and processed. Once the final test results are committed to the test result repository, the container instances implementing the test code can be terminated, and the resources associated with the terminated container instances can be redeployed within a distributed computing environment for other workloads.

Figure 3:
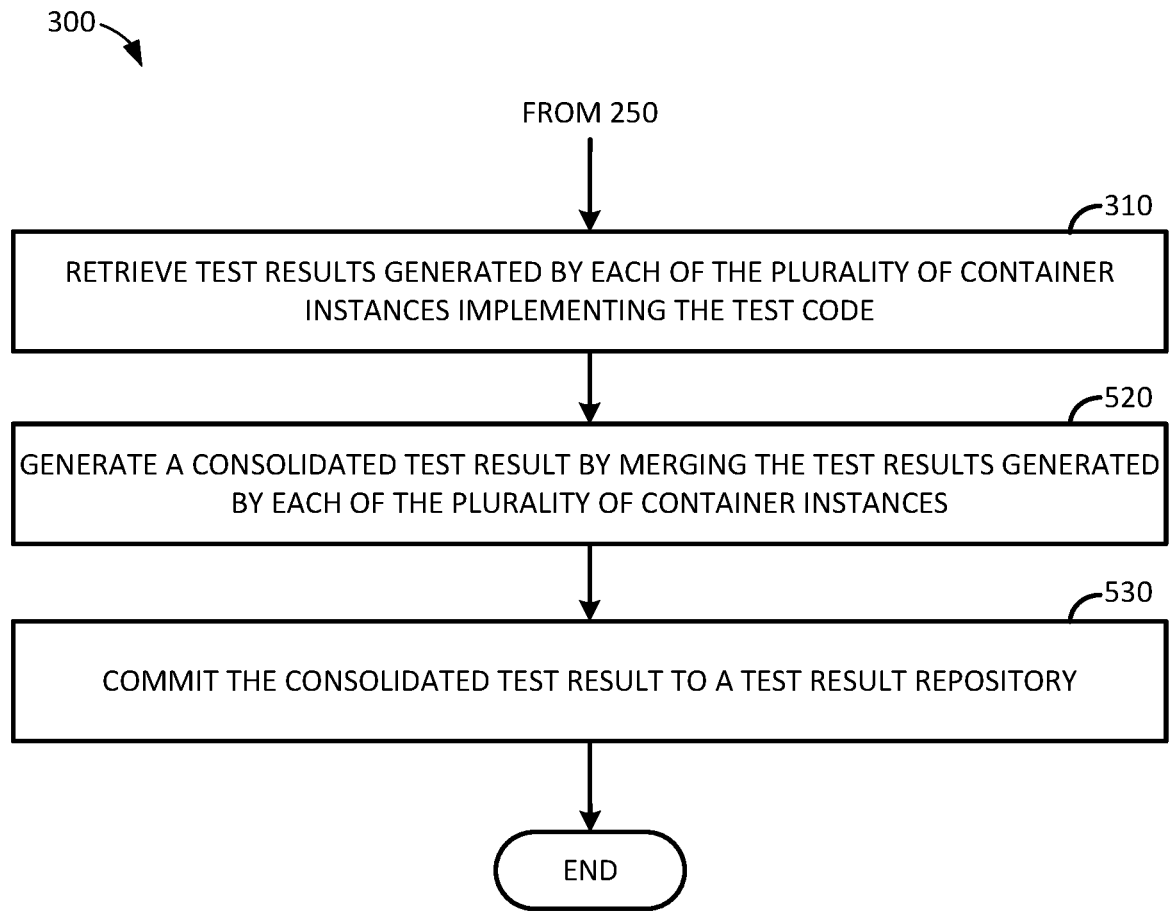
FIG. 3 illustrates example operations for committing test results of a scalable performance test performed against a service in a computing environment to a test result repository.

Example Generation of Consolidated Test Results of Performance Tests Against Executed Services in a Distributed Computing Environment FIG. 3 illustrates example operations 300 that may be performed to generate a consolidated test result from the plurality of container instances implementing the test code.

As illustrated, operations 300 may continue at block 310 from block 250 illustrated in FIG. 2. At block 310, the system retrieves test results generated by each of the plurality of container instances implementing the test code. The test results generated by a specific container instance may include, for example, a summary test result specifying a total number of tests executed against the application code, average responsiveness data, average correctness data, and/or other aggregated metrics for the tests executed by the specific container instance. In another aspect, the test results may include information associated with each discrete test executed against the application code.

At block 320, the system generates a consolidated test result. To generate the consolidated test result, the system can merge the test results generated by each of the container instances into a single test result representing the recorded performance of the application code across the test code implemented in each of the container instances. The consolidated test result may thus include information about the total number of tests executed against the application code, the total number of tests that were executed successfully by the application code, the percentage of successfully executed tests, and so on.

At block 330, the system commits the consolidated test result to a test report repository. The consolidated test result may be used, for example, to identify application code that requires further development to achieve performance objectives for the code and to determine whether application code is in condition for deployment into a production environment.

Figure 4:
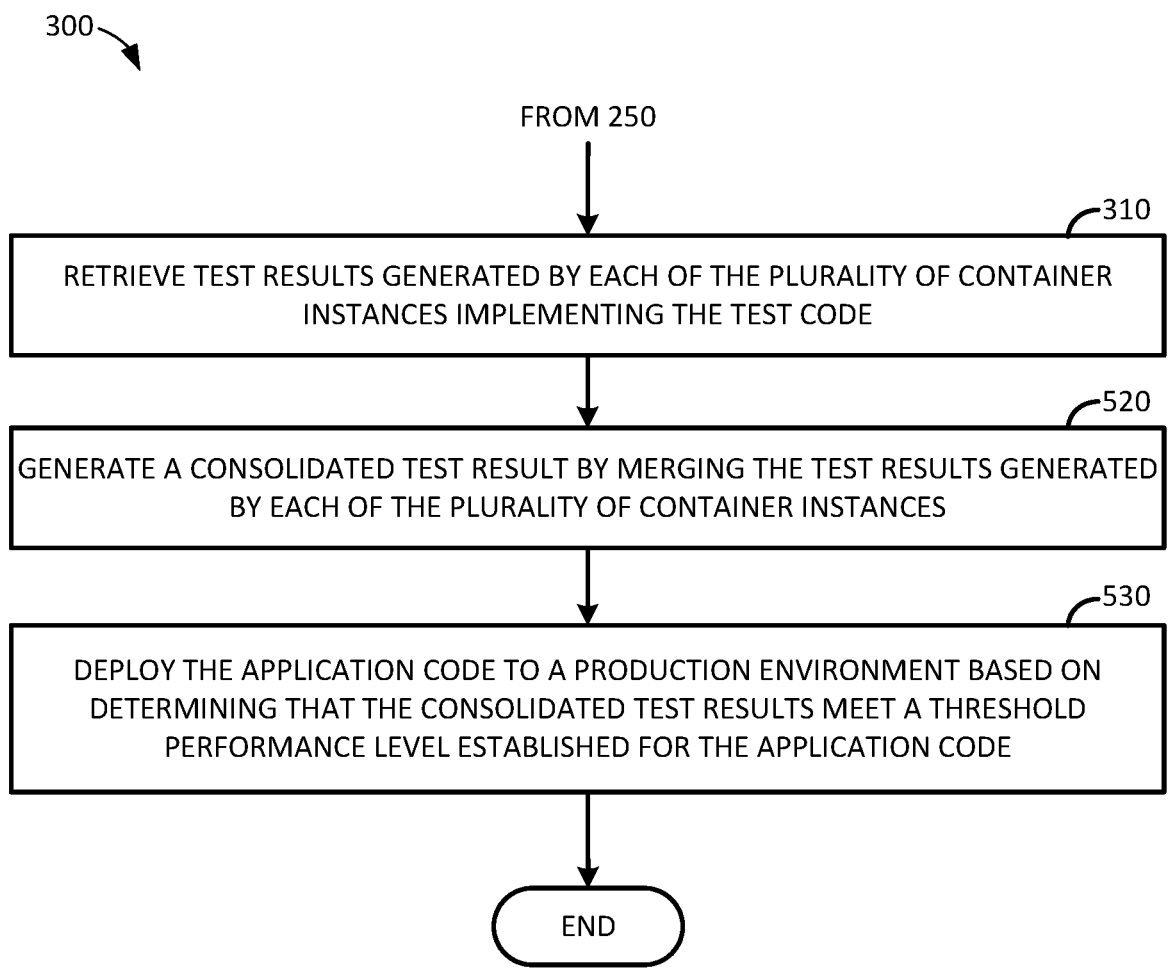
FIG. 4 illustrates example operations for deploying application code to a production environment based on the test results of a scalable performance test performed against a service in a computing environment.

Example Deployment of Application Code Based on Scalable Performance Tests Executed Against Services in a Distributed Computing Environment FIG. 4 illustrates example operations 400 may be performed to deploy application code to a production environment in a continuous integration and continuous development (CI/CD) platform based on the consolidated results of tests executed against application code in an application namespace. Generally, in a CI/CD platform, performance tests may be performed as application code changes, and each change is deployed from a development environment to a production environment as the performance and functionality of the application code is verified through the execution of one or more tests.

As illustrated, operations 400 may continue at block 410 from block 250 illustrated in FIG. 2. At block 410, the system retrieves test results generated by each of the plurality of container instances implementing the test code. The test results generated by a specific container instance may include, for example, a summary test result specifying a total number of tests executed against the application code, average responsiveness data, average correctness data, and/or other aggregated metrics for the tests executed by the specific container instance. In another aspect, the test results may include information associated with each discrete test executed against the application code.

At block 420, the system generates a consolidated test result. To generate the consolidated test result, the system can merge the test results generated by each of the container instances into a single test result representing the recorded performance of the application code across the test code implemented in each of the container instances. The consolidated test result may thus include information about the total number of tests executed against the application code, the total number of tests that were executed successfully by the application code, the percentage of successfully executed tests, and so on.

At block 430, the system deploys the application code to a production environment based on determining that the consolidated test results meet a threshold performance level established for the application code. In deploying the application code to a production environment, the system can compile the application code and replace a previous version of the application code executing on virtual compute instances associated with the production environment with the newly compiled version of the application code. In some aspects, the system can terminate the virtual compute instances on which a previous version of the application code is executing and can re-designate the virtual compute instances in the application namespace as production environment compute resources.

If, however, the system determines that the consolidated test results do not satisfy the threshold performance level established for the application code, the system can place a block on the application source code in application source code repository 112 indicating that the current version of the application source code is not ready for deployment to a production environment. The system can, in some aspects, generate an alert to one or more developers responsible for developing the application source code indicating that the application source code failed a performance test. The system may remove the block on deploying the application source code if the consolidated test results of a subsequent test indicate that the application code is now in condition for deployment to a production environment (e.g., meets the performance requirements defined for the application code).

Figure 5:
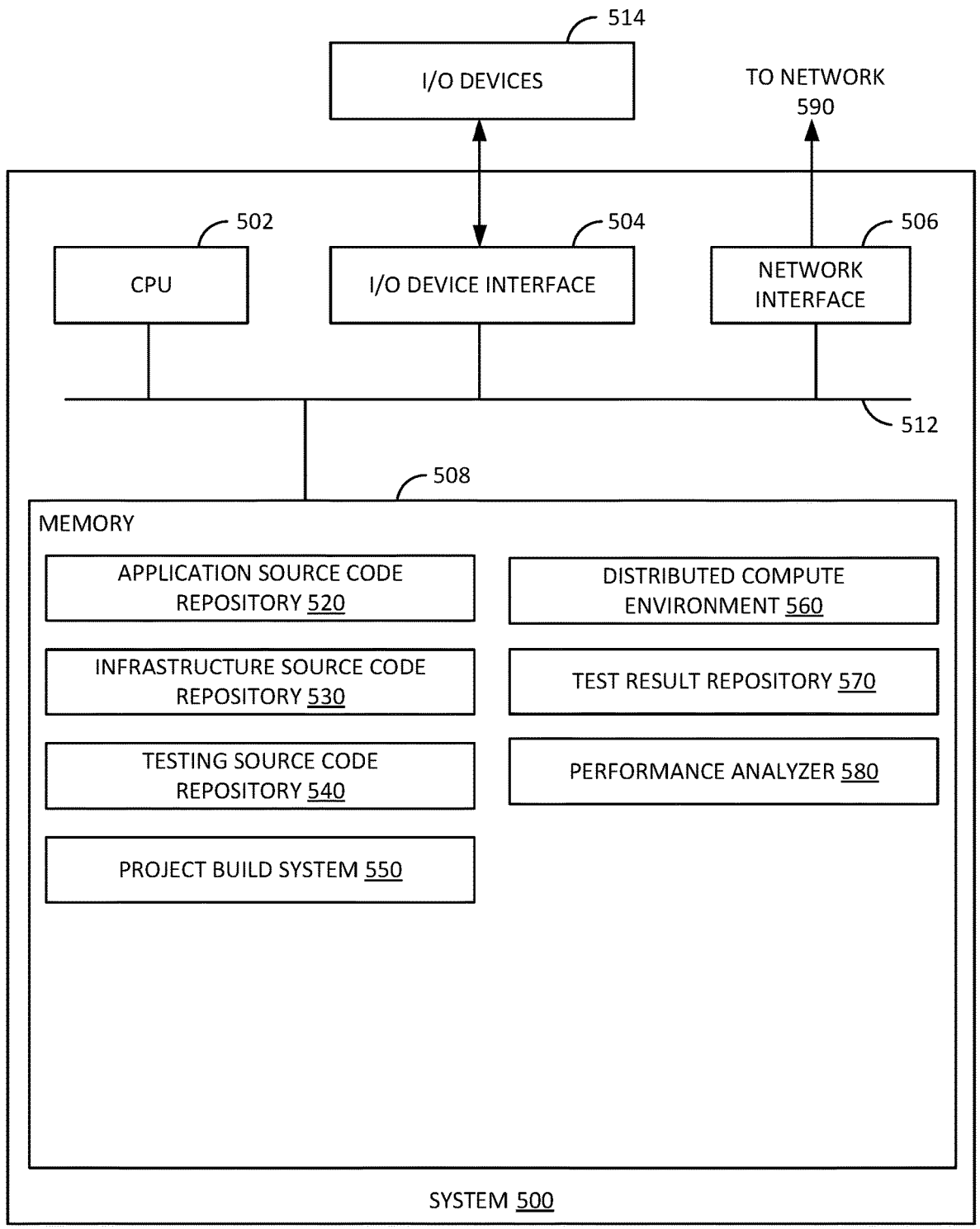
FIG. 5 illustrates an example computing system on which embodiments of the present disclosure may be implemented.

Example Systems for Scalable Performance Testing of Application Code in a Distributed Computing Environment FIG. 5 illustrates an example system 500 that can scalably execute performance testing of application code in a distributed computing environment. For example, system 500 may comprise one more of application source code repository 112, infrastructure source code repository 114, testing source code repository 116, project build system 120, distributed compute environment 130, test result repository 140, and/or performance analyzer 150 illustrated in FIG. 1.

As shown, system 500 includes a central processing unit (CPU) 502, one or more I/O device interfaces 504 that may allow for the connection of various I/O devices 514 (e.g., keyboards, displays, mouse devices, pen input, etc.) to the system 500, network interface 506 through which system 500 is connected to network 550 (which may be a local network, an intranet, the internet, or any other group of computing devices communicatively connected to each other), a memory 508, storage 510, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 504, memory 508, and storage 510.

CPU 502 is included to be representative of a single CPU, multiple CPUs, a single CPU having multiple processing cores, and the like.

Memory 508 is representative of a volatile memory, such as a random access memory, or a nonvolatile memory, such as nonvolatile random access memory, phase change random access memory, or the like. As shown, memory 508 includes an application source code repository 520, infrastructure source code repository 530, testing source code repository 540, project build system 550, distributed compute environment 560, test result repository 570, and performance analyzer 580.

Application source code repository 520, infrastructure source code repository 530, and testing source code repository 540 may correspond to application source code repository 112, infrastructure source code repository 114, and testing source code repository 116, respectively, illustrated in FIG. 1. Each of these repositories generally represent data stores in which source code compiled by project build system 550 is stored. Source code for an application (or portion thereof) being tested may be stored in application source code repository 520. Source code for generating an infrastructure namespace in which virtual compute instances hosting compiled test code may be stored in infrastructure source code repository 114. Finally, source code for executing tests against an application may be stored in testing source code repository 116.

Project build system 550 may correspond to project build system 120 illustrated in FIG. 1. Generally, project build system 550 uses the source code in application source code repository 520 to build instances of the application for deployment in one or more virtual compute instances associated with an application namespace in distributed compute environment 560. Project build system 550 uses the source code in infrastructure source code repository 530 to build an infrastructure namespace in distributed compute environment 560 in which container instances for the test code executes. Finally, project build system 550 uses the source code in testing source code repository 540 to build and deploy the test code to container instances in the infrastructure namespace to execute tests against the application hosted in the application namespace.

Distributed compute environment 560 may correspond to distributed compute environment 130 illustrated in FIG. 1 and represent a plurality of virtual compute instances organized into an application namespace and an infrastructure namespace. Application code compiled by project build system 550 may be deployed to virtual compute instances associated with the application namespace and may receive and process transaction requests from test code executing in container instances associated with the infrastructure namespace. Infrastructure code compiled by project build system 550 may generate the infrastructure namespace, and test code compiled by project build system 550 may be deployed to container instances associated with the infrastructure namespace for generating transaction requests and other tests against the application code deployed to virtual compute instances associated with the application namespace.

Test result repository 570 may correspond to test result repository 140 illustrated in FIG. 1. Generally, test result repository 570 may store the results of tests executed against the application code hosted virtual compute instances associated with the application namespace. Test result repository 570 may be a searchable data repository that allows developers of a software application to search for application components that failed testing to identify which application components on which development should be focused. In some aspects, the data in test result repository 570 may also or alternatively be used as an input into a continuous integration/continuous development (CI/CD) pipeline (e.g., implemented by performance analyzer 580) to determine whether application source code is ready for promotion from a testing environment to a production environment.

Performance analyzer 580 may correspond to performance analyzer 150 illustrated in FIG. 1. Generally, performance analyzer 580 uses the test results stored in test result repository 570 and a threshold performance level defined for an application (or component thereof) to determine whether application source code is in condition for promotion from a test environment to a production environment. If the test results meet the threshold performance level defined for the application, performance analyzer 580 can deploy the application source code to a production environment and replace a previous version of the application source code with the tested, new version of the application source code. Otherwise, performance analyzer 580 can block deployment of the application source code until the results of subsequent tests indicate that the application source code compiles with the threshold performance level for the application (or component thereof).

Example Clauses

Clause 1: A method for performing performance tests against services in a computing environment, comprising: deploying application code to an application namespace hosted on a first set of resources in the computing environment; deploying testing code to an infrastructure namespace hosted on a second set of resources in the computing environment; receiving a request to test the application code, the request including information identifying a load to be generated in testing the application code; instantiating a plurality of container instances implementing the test code based on the identified load to be generated to test the application code; and executing a test against the application code through the instantiated plurality of container instances.

Clause 2: The method of Clause 1, further comprising: retrieving test results generated by each of the plurality of container instances implementing the test code; and generating a consolidated test result by merging the test results generated by each of the plurality of container instances.

Clause 3: The method of Clause 2, further comprising: committing the consolidated test result to a test report repository.

Clause 4: The method of Clauses 2 or 3, further comprising: deploying the application code to a production environment based on determining that the consolidated test results meet a threshold performance level established for the application code.

Clause 5: The method of any of Clauses 1 through 4, further comprising: compiling infrastructure code to generate the infrastructure namespace, wherein the infrastructure code exposes functionality for creating, maintaining, and terminating groups of container instances in which test code executes.

Clause 6: The method of any of Clauses 1 through 5, wherein instantiating the plurality of container instances implementing the test code comprises instantiating a plurality of resource pods on which the test code is to be executed based on the identified load to be generated and a maximum load that can be generated by each of a plurality of resource pod configurations.

Clause 7: The method of Clause 6, wherein each respective configuration of the plurality of resource pod configurations specifies an amount of memory and an amount of processing power corresponding to the maximum load the respective configuration is capable of generating against code executing in the application namespace.

Clause 8: The method of any of Clauses 1 through 7, wherein the information identifying the load to be generated comprises information identifying a number of read requests to be executed against the application namespace and a number of write requests to be executed against the application namespace over a specified time period.

Clause 9: The method of any of Clauses 1 through 8, wherein the information identifying the load to be generated comprises information identifying a duration over which the test is to be executed.

Clause 10: The method of Clause 9, further comprising: determining that an elapsed time over which the test has executed equals the identified duration over which the test is to be executed, and terminating the plurality of container instances implementing the test code based on determining that the elapsed time equals the identified duration over which the test is to be executed.

Clause 11: A method for deploying application code to a production environment based on performance tests performed against services in a computing environment, comprising: deploying application code to an application namespace hosted on a first set of resources in the computing environment; deploying testing code to an infrastructure namespace hosted on a second set of resources in the computing environment; receiving a request to test the application code, the request including information identifying a load to be generated in testing the application code; instantiating a plurality of container instances implementing the test code based on the identified load to be generated to test the application code; executing a test against the application code through the instantiated plurality of container instances; retrieving test results generated by each of the plurality of container instances implementing the test code; generating a consolidated test result by merging the test results generated by each of the plurality of container instances; and deploying the application code to a production environment based on determining that the consolidated test results meet a threshold performance level established for the application code.

Clause 12: A system, comprising: a memory having computer-executable instructions stored thereon; and a processor configured to execute the computer-executable instructions to cause the system to perform the operations of any of Clauses 1 through 11.

Clause 13: A system, comprising: means for performing the operations of any of Clauses 1 through 11.

Clause 14: A computer-readable medium having instructions stored thereon which, when executed by a processor, performs the operations of any of Clauses 1 through 11.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the embodiments set forth herein. In addition, the scope of the disclosure is intended to cover such an apparatus or method that is practiced using other structure, functionality, or structure and functionality in addition to, or other than, the various embodiments of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for performance testing computing services, comprising:
receiving a request to test application code, the request including information identifying an amount of load generated by the request in testing the application code;

calculating one or more minimal sets of resource pod configurations for the request based on the amount of load generated by the request, wherein the one or more minimal sets of resource pod configurations for the request are calculated based on a maximum amount of load that can be generated by each of a plurality of resource pod configurations and the amount of load indicated in the request, wherein the one or more minimal sets of resource pod configurations comprise a minimal set of one or more virtual compute instances (VCIs), the minimal set of one or more VCIs being selected using a resource minimization strategy that selects a lowest cost configuration of VCIs from a plurality of configurations, the plurality of configurations including configurations selected from a plurality of VCIs having a plurality of different supported transactions per second, each respective resource pod configuration of the one or more minimal sets of resource pod configurations being associated with a respective pod-level maximum load and including one or more VCIs;

instantiating a plurality of instances implementing test code for the request using the one or more minimal sets of resource pod configurations;

executing the test code using the plurality of instances;

retrieving test results generated by each of the plurality of instances;

generating a consolidated test result by merging the test results generated by each of the plurality of instances, the consolidated test result including information about a success of executing the test code; and deploying the application code based on determining that the consolidated test results meet a threshold for the application code.

2. The method of claim 1, wherein the consolidated test is generated by merging the test results generated by each of the plurality of instances, the consolidated test result including information about a total number of tests executed against the application code, a total number of tests that were executed successfully by the application code, or a percentage of successfully executed tests.

3. The method of claim 2, wherein the test results comprise, for each instance of the plurality of instances, a number of tests executed against the application code, a responsiveness data, or correctness data.

4. The method of claim 2, further comprising: committing the consolidated test result to a test report repository.

5. The method of claim 2, wherein the application code is deployed based on determining that the consolidated test results meet a threshold performance level comprising at least one of a threshold average response time and a threshold response correctness level.

6. The method of claim 1, wherein each respective configuration of the one or more minimal sets of resource pod configurations specifies an amount of memory and an amount of processing power corresponding to the maximum amount of load the respective configuration is capable of generating over a time period, a number of read requests to be executed over the time period, and a number of write requests to be executed over the time period.

7. A system, comprising:

a memory comprising executable instructions; and a processor configured to execute the executable instructions and cause the system to perform a method comprising:

receiving a request to test application code, the request including information identifying an amount of load generated by the request in testing the application code;

calculating one or more minimal sets of resource pod configurations for the request based on the amount of load generated by the request, wherein the one or more minimal sets of resource pod configurations for the request are calculated based on a maximum amount of load that can be generated by each of a plurality of resource pod configurations and the amount of load indicated in the request, wherein the one or more minimal sets of resource pod configurations comprise a minimal set of one or more virtual compute instances (VCIs). the minimal set of one or more VCIs being selected using a resource minimization strategy that selects a lowest cost configuration of VCIs from a plurality of configurations the plurality of configurations including configurations selected from a plurality of VCIs having a plurality of different supported transactions per second, each respective resource pod configuration of the one or more minimal sets of resource pod configurations being associated with a respective pod-level maximum load and including one or more VCIs;

instantiating a plurality of instances implementing test code for the request using the one or more minimal sets of resource pod configurations;

executing the test code using the plurality of instances;

retrieving test results generated by each of the plurality of instances;

generating a consolidated test result by merging the test results generated by each of the plurality of instances, the consolidated test result including information about a success of executing the test code; and deploying the application code based on determining that the consolidated test results meet a threshold for the application code.

8. The method of claim 7, wherein the consolidated test is generated by merging the test results generated by each of the plurality of instances, the consolidated test result including information about a total number of tests executed against the application code, a total number of tests that were executed successfully by the application code, or a percentage of successfully executed tests.

9. The method of claim 8, wherein the test results comprise, for each instance of the plurality of instances, a number of tests executed against the application code, a responsiveness data, or correctness data.

10. The method of claim 8, further comprising: committing the consolidated test result to a test report repository.

11. The method of claim 8, wherein the application code is deployed based on determining that the consolidated test results meet a threshold performance level comprising at least one of a threshold average response time and a threshold response correctness level.

12. The method of claim 7, wherein each respective configuration of the one or more minimal sets of resource pod configurations specifies an amount of memory and an amount of processing power corresponding to the maximum amount of load the respective configuration is capable of generating over a time period, a number of read requests to be executed over the time period, and a number of write requests to be executed over the time period.

13. A non-transitory computer readable medium storing instruction executable by a processor to perform a method for performance testing computing services, the method comprising:

receiving a request to test application code, the request including information identifying an amount of load generated by the request in testing the application code;

calculating one or more minimal sets of resource pod configurations for the request based on the amount of load generated by the request, wherein the one or more minimal sets of resource pod configurations for the request are calculated based on a maximum amount of load that can be generated by each of a plurality of resource pod configurations and the amount of load indicated in the request, wherein the one or more minimal sets of resource pod configurations comprise a minimal set of one or more virtual compute instances (VCIs). the minimal set of one or more VCIs being selected using a resource minimization strategy that selects a lowest cost configuration of VCIs from a plurality of configurations, the plurality of configurations including configurations selected from a plurality of VCIs having a plurality of different supported transactions per second, each respective resource pod configuration of the one or more minimal sets of resource pod configurations being associated with a respective pod-level maximum load and including one or more VCIs;

instantiating a plurality of instances implementing test code for the request using the one or more minimal sets of resource pod configurations;

executing the test code using the plurality of instances;

retrieving test results generated by each of the plurality of instances;

generating a consolidated test result by merging the test results generated by each of the plurality of instances, the consolidated test result including information about a success of executing the test code; and deploying the application code based on determining that the consolidated test results meet a threshold for the application code.

14. The method of claim 13, wherein the consolidated test is generated by merging the test results generated by each of the plurality of instances, the consolidated test result including information about a total number of tests executed against the application code, a total number of tests that were executed successfully by the application code, or a percentage of successfully executed tests and the application code is deployed based on determining that the consolidated test results meet a threshold performance level comprising at least one of a threshold average response time and a threshold response correctness level.

15. The method of claim 14, further comprising: committing the consolidated test result to a test report repository.

16. The method of claim 14, wherein the test results comprise, for each instance of the plurality of instances, a number of tests executed against the application code, a responsiveness data, or correctness data.

17. The method of claim 13, wherein each respective configuration of the one or more minimal sets of resource pod configurations specifies an amount of memory and an amount of processing power corresponding to the maximum amount of load the respective configuration is capable of generating over a time period, a number of read requests to be executed over the time period, and a number of write requests to be executed over the time period.

* * * * *